United States Patent [11] 3,632,867

[72] Inventor Elliott W. Markow
Burlington, Mass.
[21] Appl. No. 797,865
[22] Filed Feb. 10, 1969
[45] Patented Jan. 4, 1972
[73] Assignee Newton Electronic Systems, Inc.
Waltham, Mass.

[54] FACSIMILE SYSTEM FOR CONDENSING DATA TRANSMISSION
29 Claims, 9 Drawing Figs.

[52] U.S. Cl. .......... 178/6.8, 178/DIG. 3, 178/6.6 R, 178/6.7 R
[51] Int. Cl. .......... H04n 1/36, H04n 1/38, H04n 7/12
[50] Field of Search .......... 178/6, DIG. 3, 6.6, 6.6 A, 6.7, 6.7 A

[56] References Cited

UNITED STATES PATENTS

| | | | |
|---|---|---|---|
| 2,978,535 | 4/1961 | Brown | 178/6 |
| 3,204,026 | 8/1965 | Doundoulakis | 178/6 |
| 3,347,981 | 10/1967 | Kagan | 178/6 |
| 3,428,744 | 2/1969 | Green | 178/6 |
| 3,436,474 | 4/1969 | Saeger | 178/6 |
| 3,410,953 | 11/1968 | Quinlan | 178/DIG. 3 |

*Primary Examiner*—Bernard Konick
*Assistant Examiner*—Howard W. Britton
*Attorney*—Rich & Ericson

ABSTRACT: A facsimile system in which the transmitter employs a dual scanning rate to prescan the copy to be duplicated at a rapid rate and to transmit video data on the content of the copy, at a slower rate, only for those regions of the copy on which significant information appears. The receiver is controlled by the transmitter to reproduce the copy at a rate dictated by its local information content.

INVENTOR.
ELLIOTT W. MARKOW
BY Rich & Ericson
ATTORNEYS

INVENTOR.
ELLIOTT V. MARKOW
BY Rich & Ericson
ATTORNEYS

PATENTED JAN 4 1972

3,632,867

INVENTOR.
ELLIOTT W. MARKOW
BY *Rich & Ericson*
ATTORNEYS

INVENTOR.
ELLIOTT W. MARKOW
BY Rich & Ericson
ATTORNEYS

INVENTOR.
ELLIOTT W. MARKOW
BY
ATTORNEYS

INVENTOR.
ELLIOTT W. MARKOW
BY [signature]
ATTORNEYS

INVENTOR.
ELLIOTT W. MARKOW
BY Rich & Ericson
ATTORNEYS

FACSIMILE SYSTEM FOR CONDENSING DATA TRANSMISSION

My invention relates to the reproduction of data, and in particular to the reduction in transmission time of a facsimile reproduction employing relatively narrow band transmission lines. Conventional facsimile systems for reproducing copy at a distance employ a transmitter in which a transducer scans a document to be reproduced and produces electrical signals that are transmitted over telephone lines or other transmission means to a receiver. The receiver is provided with a recording transducer that moves over a record member such as photosensitive paper, magnetic tape, or the like, in synchronism with the transmitter scan, and records data on the record member in accordance with the information signals received from the transmitter.

While quite satisfactory for many purposes, such apparatus presents problems in use which have prevented its more widespread adoption. First, voice grade telephone transmission lines commonly in use are quite limited in bandwidth; i.e., they cannot be relied upon beyond a bandwidth of about 3 kilocycles per second. That limits the rate at which information defining the copy to be reproduced can be transmitted. In practice, conventional facsimile systems are limited to a transmission time of approximately 6 minutes per page. That limitation not only sets a floor under the cost of the facsimile process, but also greatly increases the probability of a line interruption during transmission. Such line interruptions are commonly caused by operators monitoring telephone lines, who misinterpret silence or facsimile signal noise on a line in use for facsimile transmission as an indication that the line is not in use. The objects of my invention are to reduce the time required for facsimile reproduction, and to alleviate the difficulties caused by line interruptions during transmission.

Briefly, the above and other objects of my invention are attained by a facsimile system in which the copy to be duplicated is prescanned for information content, and divided into blocks which contain information and those which do not. The classification of each block of copy with respect to the presence or absence of data is registered in the transmitter, and the contents of the register are transmitted to a similar register in the receiver. Those blocks of the copy containing information to be duplicated are transmitted at the normal video rate, whereas the blocks not containing any information are rapidly skipped over in both the transmitter and the receiver. Means are provided for resynchronizing the transmitter and receiver at frequent intervals, so that the receiver will remain locked to the transmitter. Means are further provided for detecting the absence of synchronization signals, indicating a line interruption at the receiver, so that appropriate action can be taken. Preferably, the receiver is arranged to transmit a "-transmission received" signal to the transmitter after a predetermined unit period of transmission, so that the transmitter will not continue to operate into an open line indefinitely after an interruption has occurred.

The manner in which the apparatus of my invention is constructed, and its mode of operation, will best be understood in the light of the following detailed description, together with the accompanying drawings, of a preferred embodiment thereof.

Figure 1:
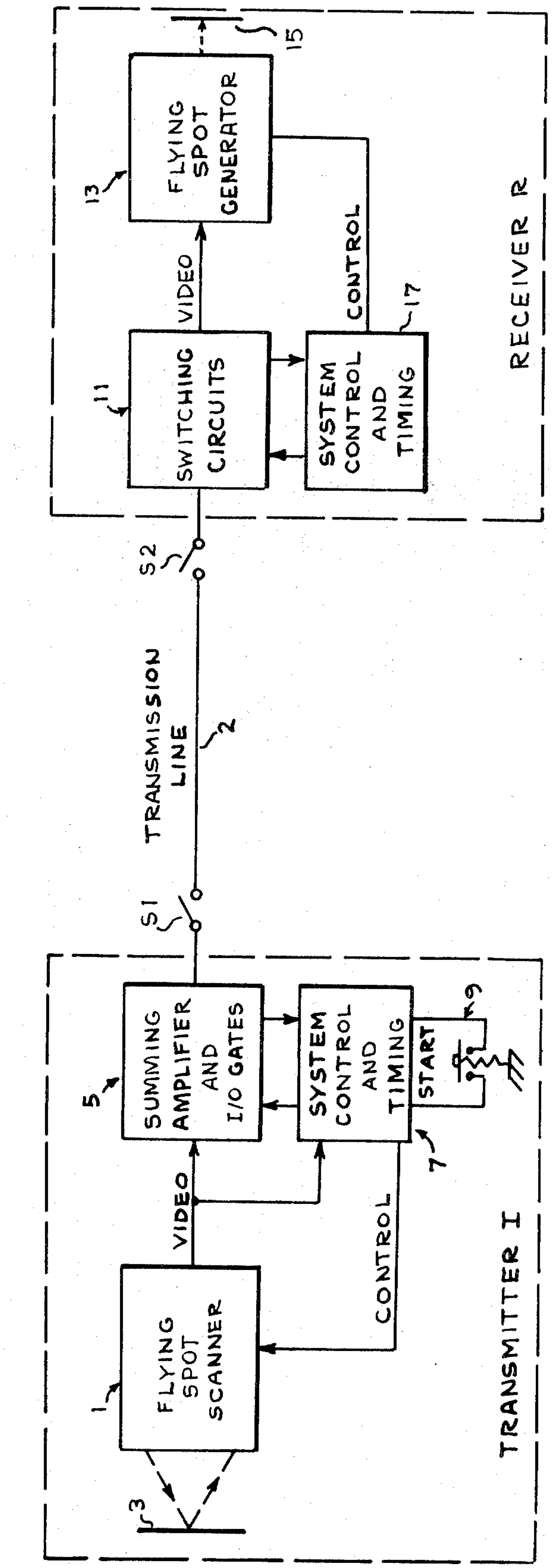
FIG. 1 is a schematic block diagram of a facsimile system in accordance with my invention.

Referring to FIG. 1, I have shown a facsimile system comprising a transmitter T connected to a receiver R over a transmission line L through switching means schematically indicated as a transmitter switch S1 and a receiver switch S2. The transmission line L may conveniently comprise a telephone line, and the switches S1 and S2 may represent the switching networks used in a telephone system for interconnecting stations.

The transmitter T comprises a variable scanning rate transducer here shown for illustrative purposes as a conventional flying spot scanner 1 adapted to scan a document 3 one line at a time and produce an electrical video signal having an amplitude corresponding to the amount of light reflected from the document 3 during the scan. The video signal from the scanner 1 is supplied to a summing amplifier and input-output gates generally designated by 5, and also to a system control and timing unit generally designated 7 which in turn controls the scanner 1 and determines the information that will be supplied to the line L by the amplifier and gates 5. The transmitter is provided with a start switch 9, to be momentarily depressed by the operator and initiate a transmission in the manner described below.

The receiver R comprises switching circuits generally designated 11 that at times supply the video signal from the line L to a transducer, here shown as a conventional flying spot generator 13, that responds to an applied video signal by reproducing it on a record member 15. The record member 15 may comprise for example, a photosensitive sheet or the like. Alternatively, the transducer and record member may be replaced by a register, such as a strip of magnetic tape of the like, to store the transmitted information for future use. The switching circuits 11 and the transducer 13 are under the control of a receiver system control and timing unit 17.

In a particular embodiment of my invention to be described, the flying spot scanner 1 was arranged to scan the document 3 in 1,024 lines. Each line was divided into four segments for transmission control purposes.

That member of segments per line is herein used merely for simplicity of explanation; a larger or a smaller number of segments per line could be advantageously used for some purposes. In addition, one or more lines at a time could be taken as the basic information block. In the particular embodiment to be described, however, the information block is here considered to be a segment one quarter of a line in length, and a transmitter register is provided for each such line segment.

Each line of the document 3 is scanned in two stages. First, it is rapidly scanned, and the register corresponding to each of the line segments in the line is set or not set depending on whether any data is encountered during the scanning of that line segment. The state of the individual transmitter registers is transmitted over the transmission line L to the receiver, where it is stored in a corresponding set of registers.

Next, the same line is rescanned; each line segment in which no data was detected is skipped over rapidly, but for each line segment in which data was detected, a slow scan at a suitable video transmission rate is made, and during that slow scan the actual video signal is transmitted over the line L to the flying spot generator 13 in the receiver.

The scanner 1 in the transmitter after having scanned the entire line is then set to begin the prescan on the next line, and the process continues until all 1,024 lines have been scanned. The receiver is maintained in synchronism with the transmitter at all times during actual data transmission, in a manner to be described, so that the reproduction on the record member 15 is synchronized with the operation of the scanner 1 in the transmitter.

Figure 2:
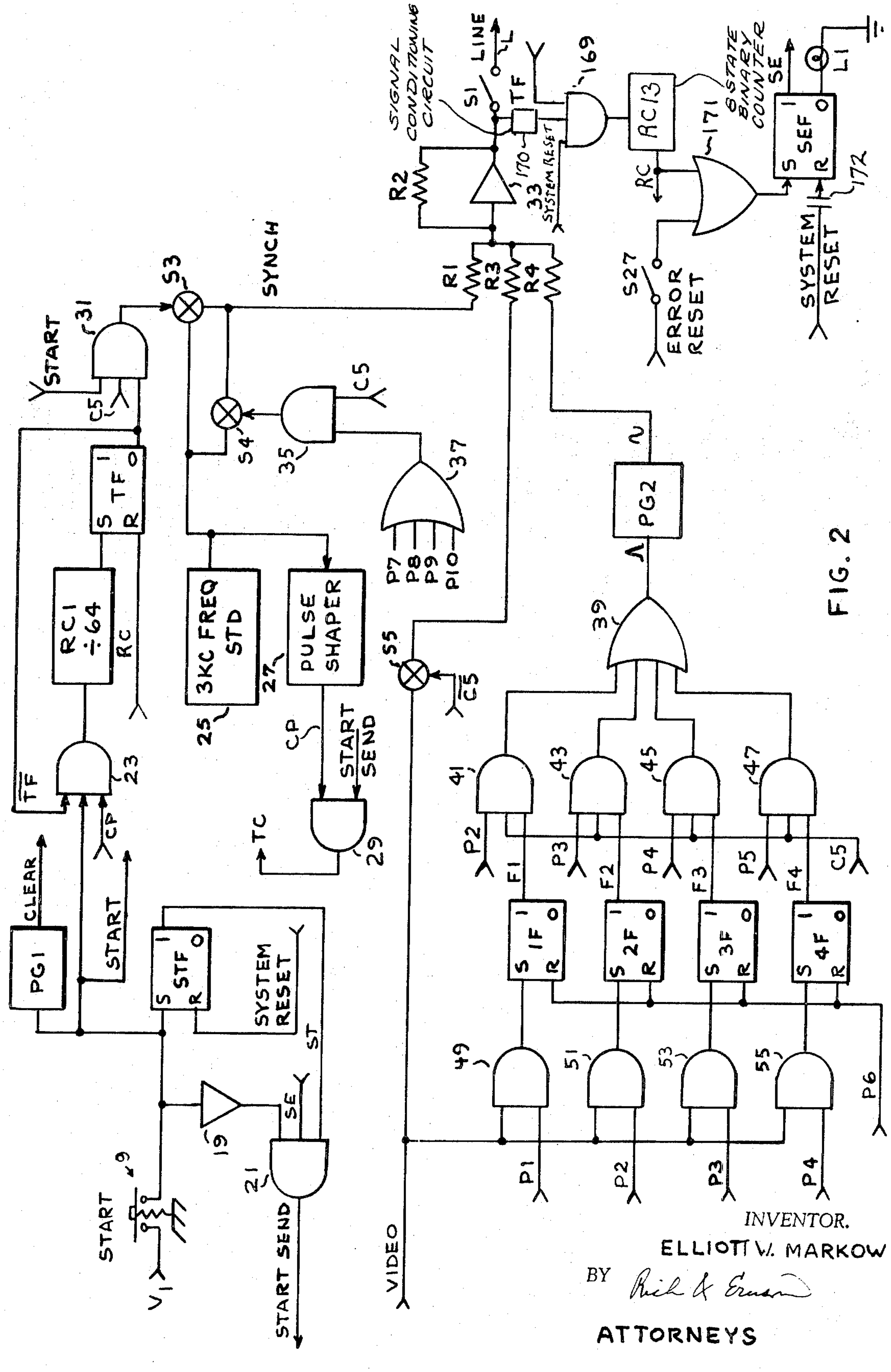
FIG. 2 is a schematic wiring diagram of a portion of a transmitter forming a part of the system of FIG. 1.
Figure 3:
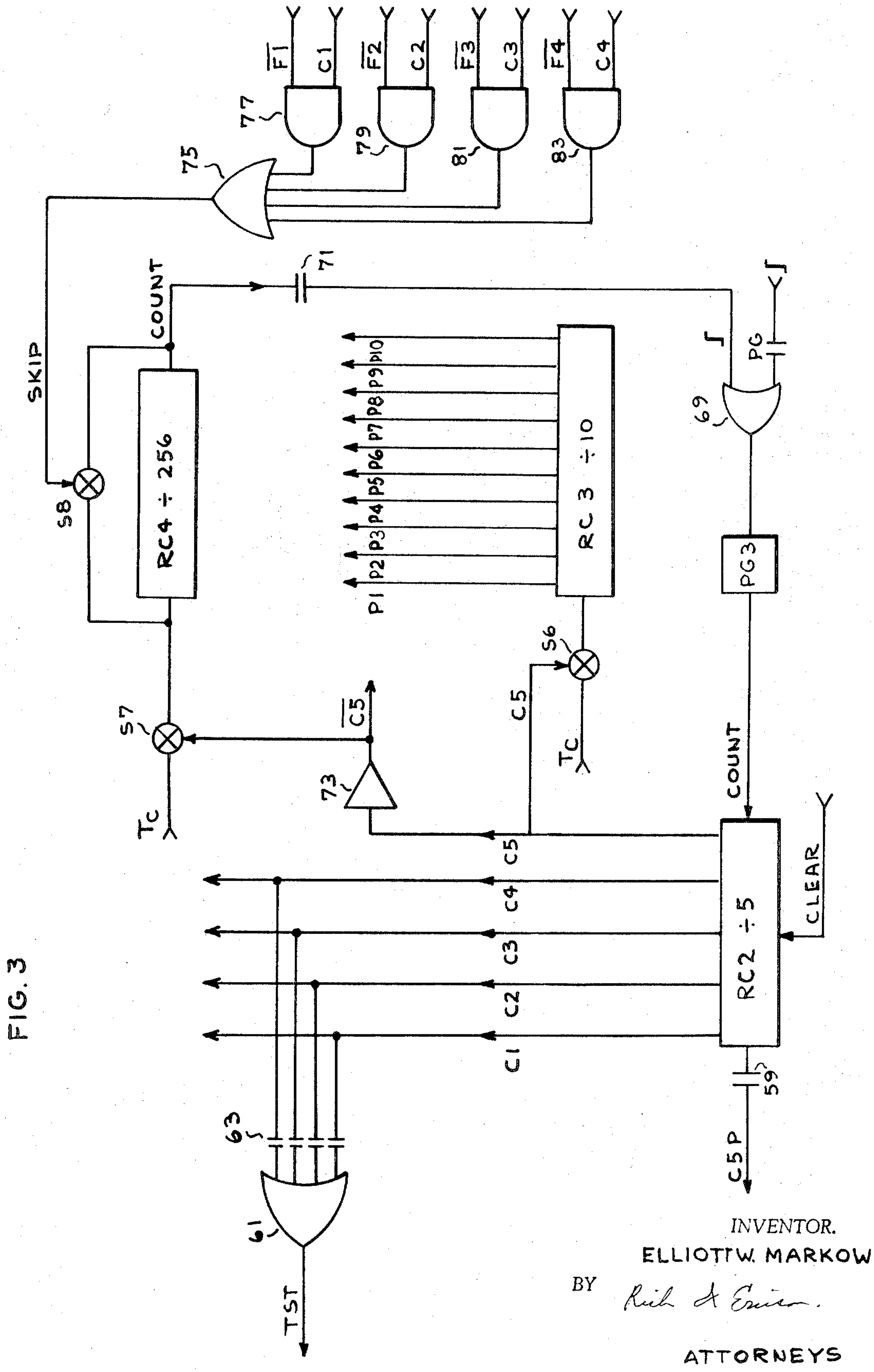
FIG. 3 is a schematic wiring diagram of a second portion of the transmitter of FIG. 1.
Figure 4:
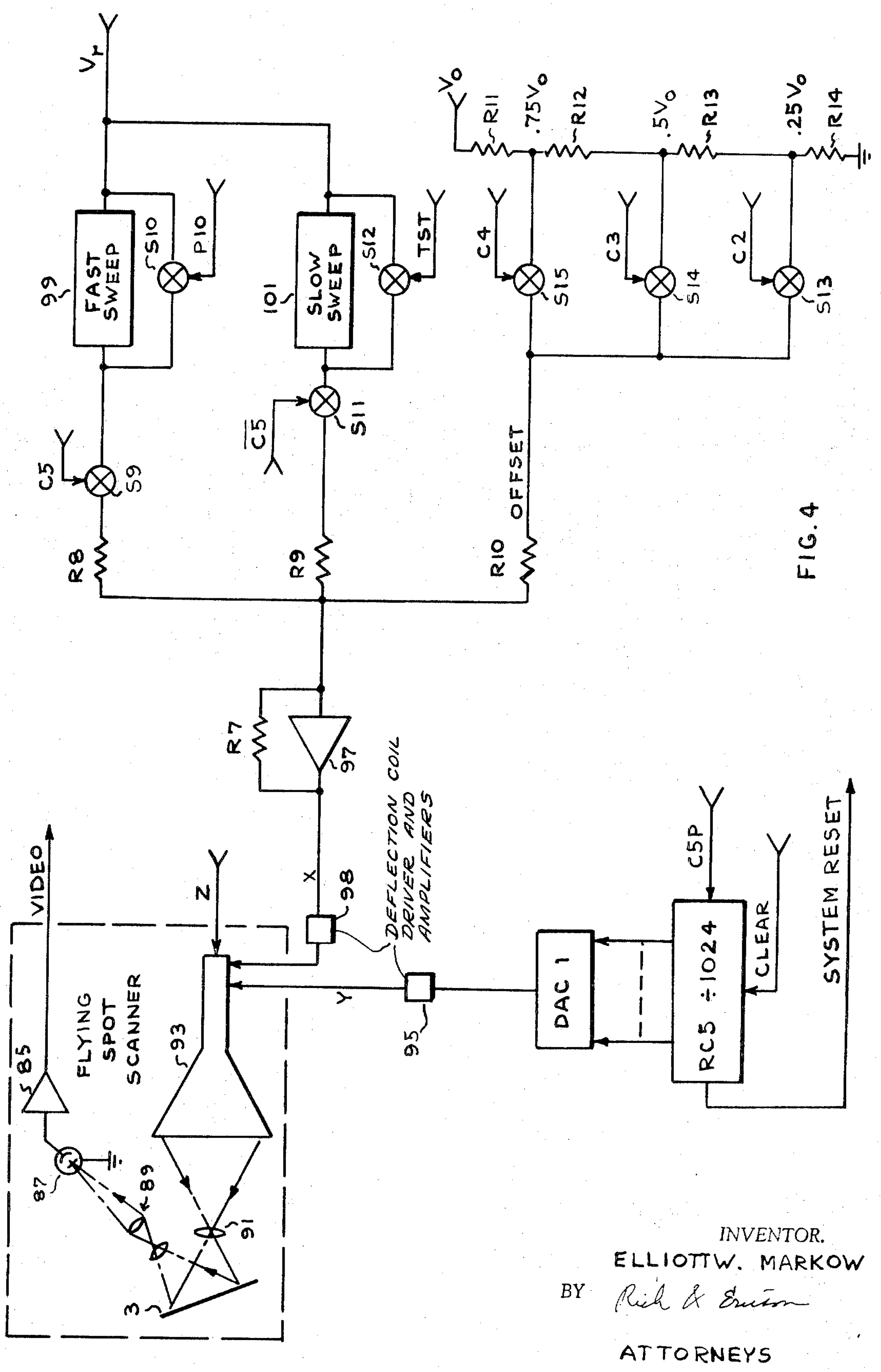
FIG. 4 is a schematic wiring diagram of a third portion of the transmitter of FIG. 1.

FIGS. 2, 3 and 4 together comprise a wiring diagram of the transmitter. FIG. 2 shows the details of a portion of the transmitter including the summing amplifier and input-out gates 5, and a portion of the system control and timing unit 7. Referring to FIG. 2, the relationship between the start pushbutton 9 and the circuits directly controlled by it will next be described.

The start pushbutton 9, when momentarily depressed, sets a start flip-flop STF by applying a suitable voltage $V_1$ to its set input terminal S. At the same time, a conventional pulse generator PG1 is triggered to produce a CLEAR pulse for purposes to be described.

While the start pushbutton is depressed, an inverter 19 applies a logic 0 input signal to one input terminal of a three-input terminal AND-gate 21. At the same time, a logic 1 input signal is applied to one input terminal of an AND-gate 23.

The transmitter is provided with a frequency standard, here shown as a 3 kilocycle-per-second sine wave oscillator 25. The output of the oscillator 25 is applied to two electronic switches S3 and S4, of any conventional construction, and also to the input of a conventional pulse shaper 27. The pulse shaper 27 produces rectangular pulses in response to transitions of the output of the oscillator 25 of a predetermined polarity.

A SEND ENABLE flip-flop SEF, to be described, is normally set, producing a level SE to enable the AND-gate 21. When the start flip-flop STF is set by depression of the start pushbutton 9, a second logic 1 level ST is applied to the gate 21. When the start pushbutton 9 is then released, the gate 21 will produce the level START SEND that will enable another AND-gate 29 to produce transmitter clock pulses TC in response to each pulse CP produced by the pulse shaper 27.

The clock pulses CP from the pulse shaper 27 are applied to the AND-gate 23 together with the START level, present when the start pushbutton 9 is depressed, and a level $\overline{TF}$, present when a transmission flip-flop TF, to be described, is reset. Since the start pushbutton 9 is manually operated, in general a large number of clock pulses CP will be produced during the period in which it is closed. So long as the flip-flop TF remains reset, the gate 23 will pass these pulses to a counter RC1 comprising a conventional 64 state binary counter. When the counter RC1 has counted 64 of these pulses, it will produce an output pulse setting the transmission flip-flop TF to its logic 1 state, disabling the gate 23.

During the period in which the start pushbutton 9 is depressed and the flip-flop TF remains reset, an AND-gate 31 is enabled. If a signal C5, generated as will be explained, is present at that time, as it normally would be at time of start, the gate 31 is effective to produce a logic 1 output signal that closes the electronic switch S3 to apply the output of the frequency standard 25, through a conventional summing resistor R1, to the input terminal of a summing amplifier 33.

The summing amplifier 33 is provided with a conventional feedback resistor R2, and has two additional input summing resistors R3 and R4 connected to its input terminal. The output terminal of the summing amplifier 33 is connected over the switch S1 to the transmission line L.

The second switch S4 connected in parallel with the switch S3 is at times closed by an AND-gate 35 to admit the output of the frequency standard 25 to the summing amplifier 33. The gate 35 is enabled when the signal C5 is present and an OR-gate 37 produces a logic 1 output signal. The OR-gate 37 receives four signals P7, P8, P9 and P10, produced under circumstances to be described below.

The second summing resistor R3 at the input terminal of the amplifier 33 at times receives a video signal through an electronic switch S5 that is closed when the level $\overline{C5}$ is present. When the switch S5 is closed, video data is admitted to the line L to control data reproduction at the receiver.

An input signal is applied to the amplifier 33 through the third summing resistor R4 by a pulse generator PG2 that produces a balanced output pulse each time an OR-gate 39 produces a logic output signal. The OR-gate 39 has four input terminals, each connected to a different one of the output terminals of four AND-gates 41, 43, 45 and 47.

Each of the gates 41 through 47 receives a signal C5. The gate 41 receives the signal P2 and a signal F1 that is present when a flip-flop 1F is set. The gate 43 receives the signal P3, and a signal F2 that is logic 1 when a flip-flop 2F is set. Similarly, the gate 45 receives a signal P4, and a signal F3 produced when a flip-flop 3F is set, and the gate 47 receives a signal P5, and a signal F4 that is logic 1 when a flip-flop 4F is set.

The flip-flops 1F, 2F, 3F and 4F, respectively, which serve as registers corresponding to line segments previously described are each arranged to be set at times by a different one of four AND-gates 49, 51, 53 and 55, respectively. Each of the flip-flops 1F through 4F is arranged to be reset by a signal P6.

The gates 49, 51, 53 and 55 are each enabled by a different one of the signals P1 through P4, and each has a second input terminal connected to the video line. As will appear, flip-flops 1F through 4F are arranged to store data concerning the presence or absence of information in each of four line segments for each line of the copy to be duplicated that is scanned.

Preferably, the transmitter includes apparatus for detecting the reception of a message by the receiver. As shown in FIG. 2, the apparatus for that purpose includes a conventional signal conditioning circuit 170, comprising an amplifier and wave shaping circuits for producing suitable gating signal levels in response to pulses appearing on the line L. The signals so produced are applied to one input terminal of an AND-gate 169. A second input terminal of the gate 169 receives the SYSTEM RESET signal, and a third input terminal receives the signal TF.

The output terminal of the gate 169 is connected to a conventional 8 state binary counter RC13. In response to eight applied logic 1 pulses from the gate 169, the counter RC13 produces an output pulse that sets the SEND ENABLE flip-flop SEF through an OR-gate 171.

The flip-flop SEF can also be set by actuation of a manual error RESET switch S27. A SYSTEM RESET pulse is applied through a capacitor 172 to reset the flip-flop SEF. When the flip-flop SEF is in the reset state, an indicating lamp L1 is illuminated.

Referring next to FIG. 3, the transmitter further comprises a five state ring counter RC2 that may be of any conventional design. The ring counter RC2 is adapted to be advanced by count pulses at times produced by a pulse generator PG3. The ring counter RC2 is also arranged to be reset to its C5 state by the CLEAR pulse produced by the pulse generator PG1 in FIG. 2.

The outputs of the several stages of the ring counter RC2 produce five signals C1, C2, C3, C4 and C5, which occur sequentially in response to an input pulse stimulus from PG3, but never simultaneously. The counter RC2 is also arranged to produce a pulse C5P through a capacitor 59 at the leading edge of the transition of the counter from state C4 to C5. That pulse is used for purposes to be described.

The output signals C1 through C5 from the ring counter RC2 are applied to the four input terminals of an OR-gate 61 through a set of capacitors such as 63 to produce a pulse at the leading edge of each of the signals C1, C2, C3 and C4. This pulse, labeled TST in FIG. 3, is used for purposes to be described. The signals C1 through C5 are also used elsewhere in the apparatus in a manner to be described.

The signal C5, the beginning of which denotes the end of a line scan, is employed to close a conventional electronic switch S6 that will admit transmitter clock pulses TC to a ring counter RC3, for purposes to be described. The counter RC3 may be any conventional ring counter.

The counter RC3 produces 10 output signals on different leads labeled P1 through P10. When the ring counter RC3 is set to the state P6, a pulse is produced through a capacitor 67 that is transmitted through an OR-gate 69 to actuate the pulse generator PG3 to produce the count pulse to advance the counter RC2. At other times, the gate 69 passes a pulse applied through a capacitor 71 when a conventional binary counter RC4, comprising a 256 state binary counter, reaches count 256.

The counter RC4 is arranged to be stepped by transmitter clock pulses TC when a conventional electronic switch S7 is closed. This switch is closed by the signal $\overline{C5}$ produced through an inverter 73 when the signal C5 is not present.

As shown, the counter RC4 is shunted by a switch S8, that is closed when a level SKIP is produced by an OR-gate 75. The function of S8 will be explained later. The gate 75 produces a logic 1 SKIP level each time any of a set of four AND-gates 77, 79, 81 and 83 produces a logic 1 output signal. The gate 77 does so when the signals $\overline{F1}$ and C1 are present; the gate 79 when the levels $\overline{F2}$ and C2 are present; the gate 81 when the levels $\overline{F3}$ and C3 are present; and the gate 83 when the levels $\overline{F4}$ and C4 are present.

Referring next to FIG. 4, the remaining elements in the transmitter T will next be described. First the video signal described above is produced by an amplifier 85 forming a part of the flying spot scanner 1. The amplifier is controlled by a photocell 87 that receives an image of the record sheet 3 through a lens system 89. A flying spot of light is applied to the record 3 through a lens 91 at a position determined by the current position of the electron beam in a cathode ray tube 93.

The cathode ray tube 93 receives a first deflection voltage X, a second deflection voltage Y, and an intensity control voltage Z. For convenience of description, the voltage X will be assumed to be a horizontal deflection voltage, and the voltage Y will be assumed to be a vertical deflection voltage. It will be apparent to those skilled in the art, however, that other choices of scanning coordinates could be made. The intensity control voltage Z may be constant during operation, although it is preferably arranged to be adjusted for best response of the flying spot scanner to the particular copy 3.

The vertical deflection voltage Y is produced by a deflection coil driver and amplifier 95 of conventional design. The input voltage applied to the amplifier 95 is controlled by a conventional digital-to-analog converter DAC1 under the control of a 10-state ring counter RC5 that may be a conventional 1024 state counter. The counter RC5 is arranged to be reset to a zero count by the CLEAR pulse produced by the pulse generator PG1 in FIG. 2. The counter RC5 is advanced by the pulses C5P produced at the leading edge of each signal C5 produced by the counter RC2 in FIG. 3. The counter RC5 is also arranged to produce a SYSTEM RESET pulse after count 1024, when the counter is reset to zero by a pulse C5P produced under conditions to be described. The SYSTEM RESET pulse is employed to restore the apparatus to condition for the transmission of a new document.

The horizontal deflection voltage X is supplied by a deflection coil driver and amplifier 98 of conventional design, being driven by connecting summing amplifier 97. Three input summing resistors R8, R9 and R10 are connected to the input of summing amplifier 97. When an electronic switch S9 is closed, by the signal C5, a fast-sweep generator 99 at times produces a ramp voltage that has a duration equal to four cycles of the frequency standard 25. The start of the fast-sweep 99 is controlled by an electronic switch S10 that is closed when the signal P10 is produced to clamp the output of the sweep circuit 99 to zero, and then allow it to rise during the occurrence of the pulse C5, when the signal P10 is removed, under the control of a constant sweep reference voltage VR applied to its input terminal. The sweep generator 99 may be conventional ramp generator having the appropriate time constant.

When a switch S11 is closed by the level $\overline{C5}$, a slow sweep generator 101 is effective to energize the amplifier 97. The slow sweep generator 101 may be of the same type as the sweep generator 99, except that it has a longer time constant by a factor of 64. It is reset by an electronic switch S12 each time a pulse TST is produced by the gate 61 in FIG. 3. The operation of the slow-sweep circuit 101 will best be understood in the light of the description of FIGS. 5 through 7 below.

The resistor R10 serves to introduce an offset voltage in dependence on the line segment being scanned. When the state C1 of the counter RC2 is present, no offset voltage is applied, and the horizontal sweep starts from one side of the screen. When the signal C2 is present, a switch S15 is closed. The switch S15 is connected to the junction of a pair of resistors R13 and R14 that are connected in series with another pair of resistors R11 and R12 between a reference source of voltage VO and ground. When the switch S15 is closed, an offset voltage starting the horizontal sweep at one-fourth of the way across the screen is produced. Similarly, when the level C3 is produced the switch S14 is closed to cause an offset voltage starting the horizontal sweep in the middle of the screen to be produced. When the signal C4 is present, a switch S13 is closed to introduce an offset voltage that will start the horizontal sweep three-fourths of the way across the screen.

Figure 5:
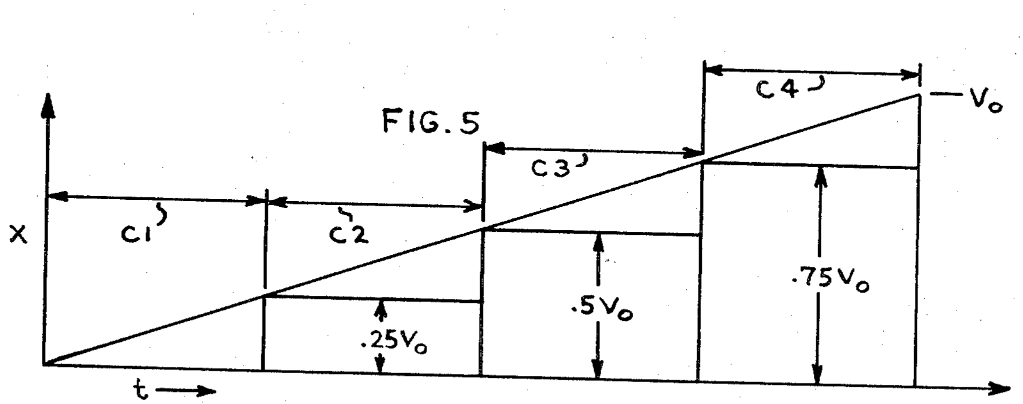
FIG. 5 is a graph of voltage versus time illustrating the scanning operation characteristic of the transmitter and receiver of FIG. 1 under one set of conditions.

Referring next to FIG. 5, I have shown the scanning cycle that occurs when a line containing information in each of the four line segments is being scanned by the scanner 1. Referring to FIG. 3, it will be recalled that the ring counter RC4 is effective when the level $\overline{C5}$ is present to count to 256 and then advance the ring counter RC2. Under the conditions described, the level SKIP will not be produced during the interval in which the signals C1, C2, C3 and C4 are produced, so that the counter RC4 will count to 256 during each of these intervals.

In the first interval, when the signal level C1 is present, the sweep voltage will be that appearing at the output of the slow-sweep generator 101. During the next interval, the output will increase at the same rate, but will start at the level 0.25 $V_o$ and thus continue the scan for the next 256 counts. During the level C3, the same procedure will be repeated, but starting at a level 0.5 $V_o$. At count C4, the sweep generator will again be energized to finish the sweep starting from 0.75 $V_o$.

Figure 6:
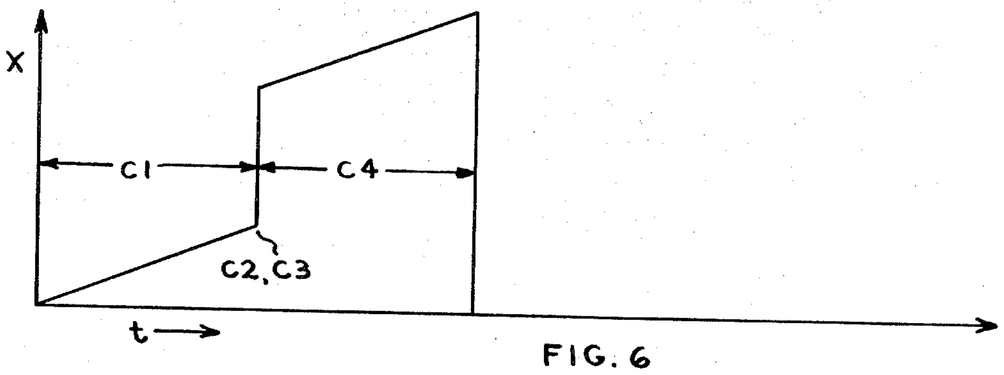
FIG. 6 is a graph of voltage versus time corresponding to that of FIG. 5 but illustrating operation under different conditions.

Referring now to FIG. 6, I have illustrated the scanning cycle for a line in which information appears in the first and fourth segments, but not in the intervening segments. During each of the count periods C1 and C4, the sweep voltage is generated just as in the situation illustrated with respect to FIG. 5. Referring to FIG. 3, when the signals C2 and C3 are present, the SKIP pulse will be produced to shunt the counter RC4, so that the ring counter RC2 is advanced rapidly to count C4. Since the counts C1 and C4 last for 256 clock pulses, while the counts C2 and C3 each last only for one clock pulse, it will be apparent that the intervals of C2 and C3 cannot be shown to scale in FIG. 6.

Figure 7:
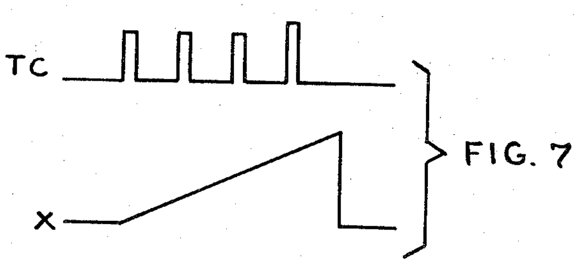
FIG. 7 is a composite diagram of voltage versus time illustrating the relationship between clock pulses in the system of FIG. 1 and the horizontal sweep voltage during a short scan.

FIG. 7 illustrates the relationship between the fast sweep pulse, at the output of the sweep generator 99, and the clock pulses TC. As shown, duration of the fast horizontal sweep voltage X is equal to that of four clock pulses.

Figure 8:
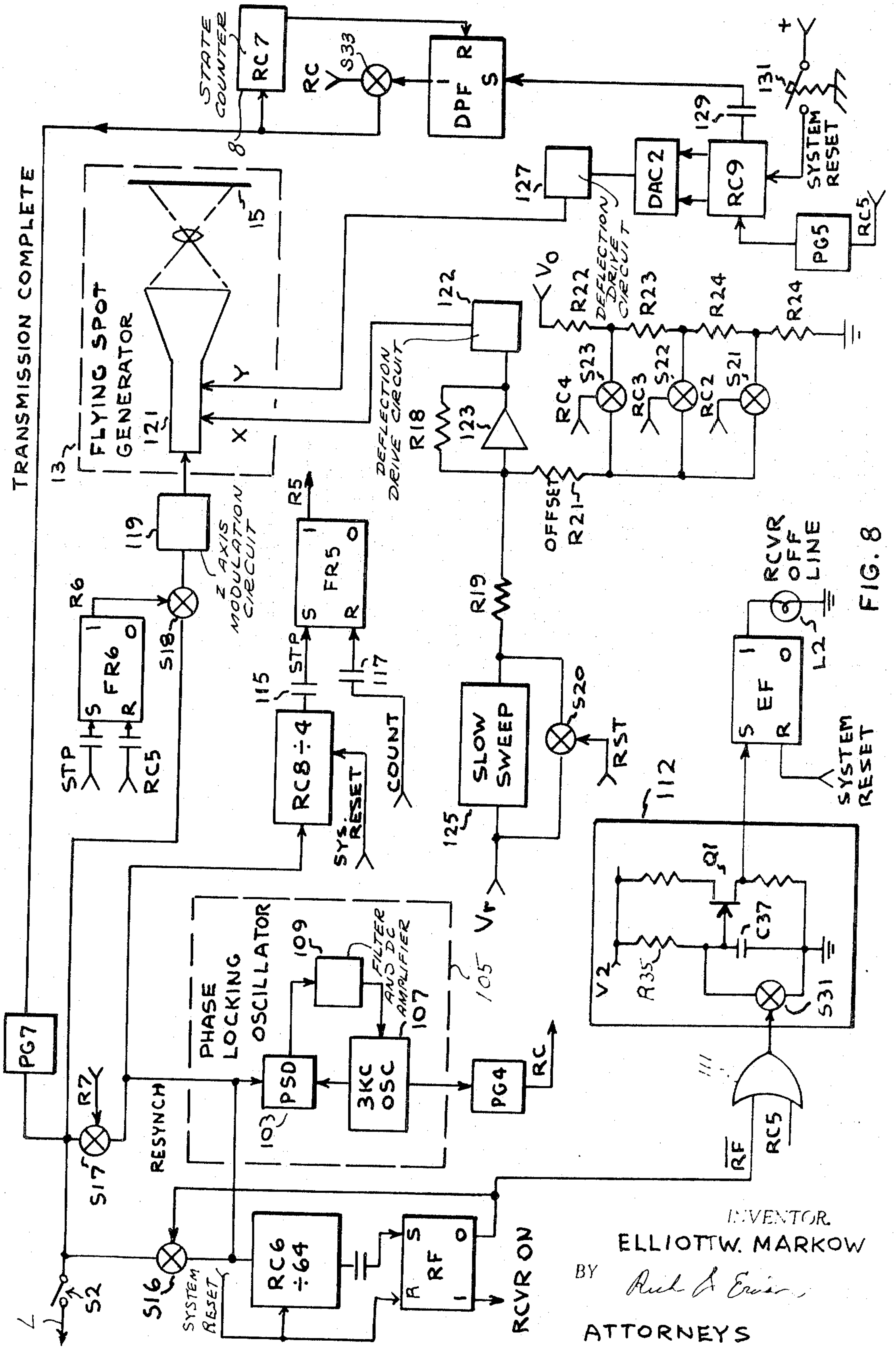
FIG. 8 is a schematic wiring diagram of a portion of a receiver forming a part of the system of FIG. 1.
Figure 9:
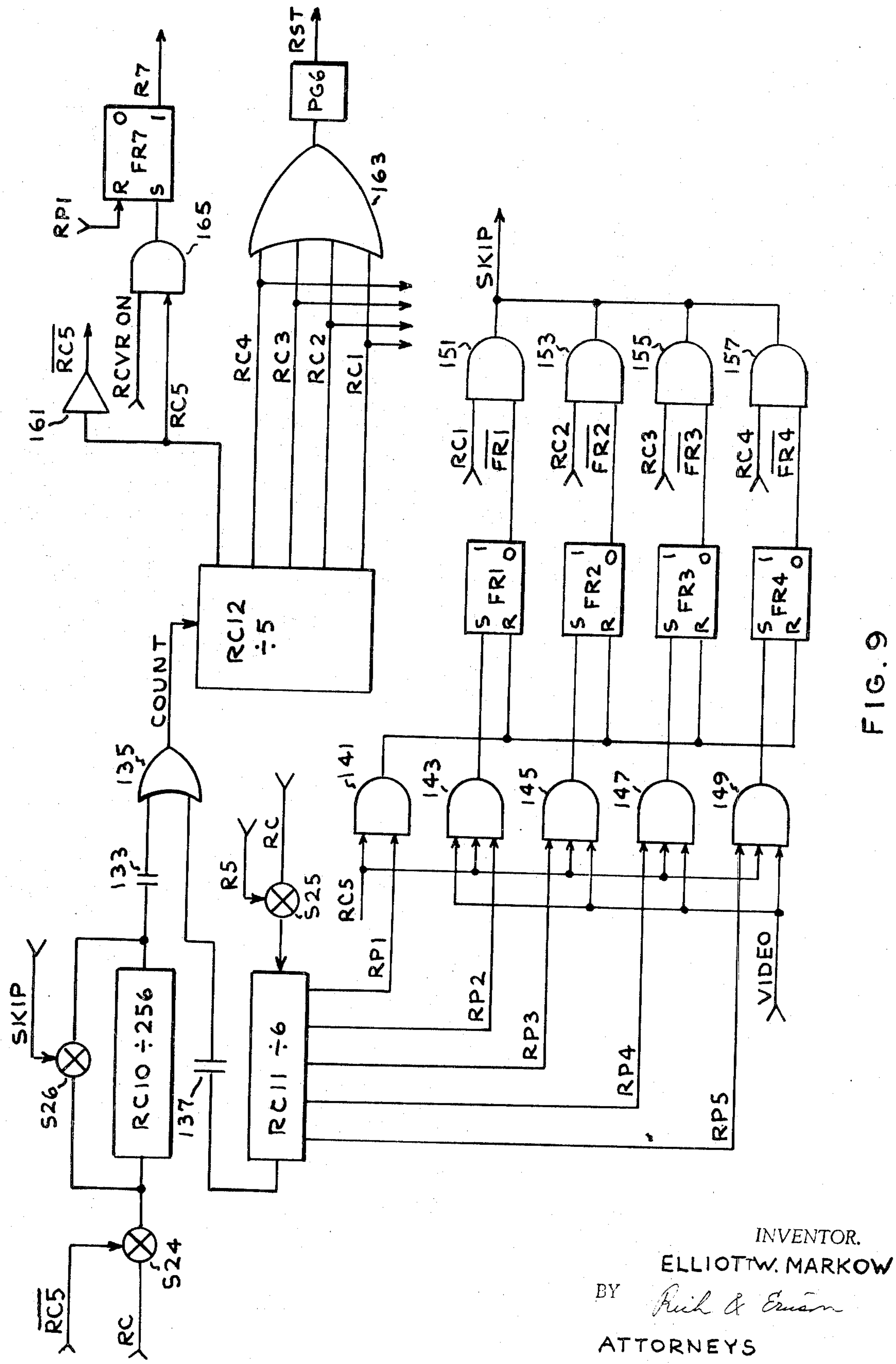
FIG. 9 is a schematic wiring diagram of another portion of the receiver of FIG. 1.

FIGS. 8 and 9 show a wiring diagram of the receiver. On FIG. 8 the first portion of the circuit to be described is concerned with initially synchronizing the apparatus when the transmitter start button 9 is depressed. As will be described in more detail below, when that occurs 64 cycles of the output frequency standard 25 in FIG. 2 are applied to the line and appear at the receiver when the switch S2 in FIG. 8 is closed.

In the normal state of the receiver, while awaiting transmission when the switch S2 is closed, a flip-flop RF in FIG. 8 is in the reset state and closes a switch S16 to admit the 64 cycles of the standard frequency to a conventional counter RC6 that may comprise any conventional binary counter with 64 states. At the same time, the incoming signals are applied to a phase-sensitive detector forming a part of a phase-locking oscillator 105. The phase-sensitive detector 103 compares the incoming signals in phase with the output of a three kilocycle oscillator 107 and applies an output signal indicating the phase difference to a filter and DC amplifier 109 that readjusts the phase of the oscillator 107 to phase lock it to the clock signal appearing at the receive input terminals and emanating from the transmitter.

When the ring counter RC6 reaches count 64, it will produce an output pulse setting the flip-flop RF to open the switch S16. At the same time, the flip-flop RF will produce a level RECEIVER ON and remove a signal $\overline{RF}$ from OR-gate 111 for purposes to be described.

To effect a warning in the event of failure to receive new line information at the normal rate, a time delay network 112 is employed. The network 112 comprises a unijunction transistor Q1 and an associated RC network comprising a resistor R35 and a capacitor C37. An electronic switch S31 is connected across the capacitor C37, and is closed when the OR-gate 111 produces a logic 1 signal.

The gate 111 receives, the signal $\overline{RF}$, and the switch S31 is accordingly closed when the flip-flop RF is reset. The gate 111 also receives line count pulses RC5, generated in a manner to be described, so that the switch S31 is closed to discharge the capacitor C37 once for each line scan during normal reception.

The time constant of the combination R35, C37 is selected so that if the switch S31 is not closed for a selected interval of, for example, three line scan intervals (i.e., the time during which three full information lines could be recorded), the unijunction transistor Q1 will be triggered to produce a pulse setting an error flip-flop EF. When set, the flip-flop EF energizes a lamp L2 to produce a RECEIVER OFF LINE indication.

When an electronic switch S17 is closed in response to a signal R7, produced in a manner to be described, the pulses received over the line L are supplied to resychronize the phase-locking oscillator 105, and to step a counter RC8 comprising a conventional four-state binary counter. A supply of four pulses to the counter RC8 will cause it to produce an output pulse STP to set a flip-flop FR5 through a capacitor 115. The flip-flop FR5 is reset by a COUNT signal supplied through a capacitor 117 at times to be described.

The pulse labeled STP that sets the flip-flop FR5 also sets a flip-flop FR6 in FIG. 8. When the flip-flop FR6 is set, it produces a level R6 that closes an electronic switch S18 to admit video signals from the line L for use in the flying spot generator 13 and elsewhere in the apparatus.

The video signal appearing when the switch S18 is closed is applied to Z axis modulation circuitry to cause spot generation in conformance with video input. The output of 119 serves as the intensity control for a cathode ray tube 121 forming a part of the flying spot generator 13 in the receiver.

The horizontal control voltage X for the tube 121 is provided by a deflection drive circuit 122 in response to summing amplifier 123 having a feedback resistor 125 and a pair of input summing resistors R19 and R21. The resistor R19 supplies the signal from a slow-sweep generator 125 that may be the same as the slow-sweep generator 101 in FIG. 4. An electronic switch S20 connected across the slow-sweep generator 125 is closed each time a pulse RST is produced to reset the sweep generator.

An offset voltage corresponding to the offset voltage supplied to the amplifier 97 in FIG. 4 is supplied through a resistor R21 to the summing amplifier 123 in FIG. 8. The offset control circuit comprises a reference source of voltage VO connected across a series string of resistors R22, R23, R24 and R25. When the signal RC2 is produced, a switch S21 is closed to admit an offset voltage that will start the horizontal sweep one-quarter of the way across the screen. Similarly, when signals RC3 and RC4 are produced, electronic switches S22 and S23 are successively closed and opened to produce a horizontal sweep starting at one-half and three-quarters of the way across the screen, respectively.

The vertical control deflection voltage Y for the cathode ray tube 121 is produced by a deflection drive circuit 127. Circuit 127 is controlled by the output of a conventional digital to analog converter DAC2 that produces an analog output signal determined by the state of a 10-stage ring counter RC9. The counter RC9 may be a conventional 1024 state binary counter.

The counter RC9 is advanced by a pulse RC5P. The pulse RC5P is produced by a pulse generator PG5 at the leading edge of a signal RC5 when the latter is produced. When the counter RC9 is reset to zero from the state 1024, a signal is supplied through a capacitor 129 to set a flip-flop DPF.

When the flip-flop DPF is set, an electronic switch S33 is closed to apply receiver clock pulses RC to a conventional eight-state binary counter RC7 and to a pulse generator PG7. The pulse generator PG7 is connected to the line L when the switch S2 is closed, and applies a balanced pulse to the line for each applied clock pulse RC. The eighth pulse RC causes the counter RC7 to produce a pulse resetting the flip-flop DPF. Thus, a train of eight pulses comprising a TRANSMISSION COMPLETE signal is applied to the line after the counter RC9 has been reset to zero.

The counter RC9 is arranged to be reset at times by a SYSTEM RESET signal produced when a pushbutton 131 is momentarily depressed. The SYSTEM RESET signal is used to initiate an operating cycle or to restore the system to start condition after an abnormal cycle of operation in which, for example, a line interruption may have occurred so that transmission cannot be properly completed.

Referring next to FIG. 9, receiver clock pulses RC produced by the pulse generator PG4 in FIG. 8 are applied to two electronic switches S24 and S25. The switch S24 is closed by the level $\overline{RC5}$, and when closed steps a counter RC10 that is a conventional 256 state binary counter. The switch S25 is closed by the level R5, and when closed allows clock pulses RC to step a ring counter RC11. The counter RC11 may be a conventional six-state ring counter.

An electronic switch S26 is connected across the counter RC10. When the switch S26 is opened and the switch S24 is closed, and the ring counter RC10 counts to 256, a pulse will be applied through a capacitor 133 to an OR-gate 135 that supplies a COUNT signal to a ring counter RC12. The latter may be a conventional five-state ring counter. When the switch S26 is closed, by the application of a SKIP level, the first clock pulse produced when the switch S24 is closed will cause the COUNT pulse to be produced.

When the counter RC11 counts to 6, a pulse is applied through a capacitor 137 to another input terminal of the OR-gate 135 to supply a COUNT signal to step the counter RC12 for purposes to be described.

The counter RC11 is connected to produce six signals in the different states of the counter RC11 labeled RP1, RP2, RP3, RP4, RP5 and RP6. The signals RP1 through RP5 are each applied to an input terminal of a different one of a set of AND-gates 141, 143, 145, 147 and 149. A second input terminal of each of the gates 141 through 149 receives the level RC5. A third input terminal of each of the gates 143 through 149 receives the VIDEO signal from the switch S18 in FIG. 8.

Each of the gates 143, 145, 147 and 149 is arranged to set a different one of a set of flip-flops FR1, FR2, FR3, and FR4, respectively, when the corresponding gate produces a logic 1 output signal. Each of the flip-flops FR1 through FR4 is arranged to be reset by a logic 1 signal appearing at the output of the gate 141.

The SKIP signal comprises a logic 1 signal appearing at the output terminal of any of a set of AND-gates 151, 153, 155 and 157. Each of the gates 151 through 157 has one input terminal connected to a different one of the logic 0 output terminals of the flip-flops FR1 through FR4. Each of the gates 151 through 157 has another input terminal connected to receive a different one of the signals RC1, RC2, RC3 and RC4, each associated with a different one of the flip-flops FR1 through FR4 and produced by the counter RC12 in a manner next to be described.

The counter RC12 has output terminals arranged to produce the signals RC1, RC2, RC3, RC4 and RC5, each in a different one of the five states of the counter RC12. An inverter 161 is provided to produce the level $\overline{RC5}$ that closes the switch S24 in FIG. 9.

The leads on which the signals RC1 through RC4 appear are each connected to a different terminal of an OR-gate 163 that has its output terminal connected to a pulse generator PG6. The pulse generator PG6 produces an output pulse RST when the gate 163 produces a logic 1 output signal.

An AND-gate 165 in FIG. 9 receives the levels RC5 and RECEIVER ON. When these levels are both present, the gate 165 sets the flip-flop FR7 to produce the level R7. The flip-flop FR7 is reset by the signal RP1 produced by the counter RC11.

Having described the structure of the apparatus of my invention, its operation under typical conditions will next be described with reference to FIGS. 1 through 9. Referring first to FIG. 1, assume that the switches S1 and S2 have been closed to establish a transmission line connection between the transmitter T and the receiver R, and that a document to be copied is located at 3 in FIG. 1. It is assumed that a record member 15 is in position in the receiver R. Assume initially that the start switch 9 is open.

In the transmitter, the initial states of the several components are as follows: In FIG. 2, the flip-flops STF, TF, SEF, 1F, 2F, 3F and 4F are reset. The counter RC1 is in state zero. In FIG. 3, the counter RC2 is in the state C5, and the counter RC3 is in the state P6. In FIG. 4, the counter RC5 is in the zero state in which line 1 is scanned.

In the receiver, the initial states of the several components are as follows: In FIG. 8, the flip-flops FR5, FR6 EF, DPF and RF are reset, and the counters RC6, RC7, RC8 and RC9 are in their zero states. No spot is generated by the flying spot generator 13, because the switch S18 is open. In FIG. 9, the flip-flops FR1, FR2, FR3, FR4 and FR7 are reset. The counter RC11 is in the state RP6, the counter RC12 is in the state RC5, and the counter RC10 is in the zero state.

Next, assume that the start switch 9 in FIG. 2 is momentarily depressed. The first result will be the setting of the start flip-flop STF, and the production of a CLEAR pulse by the pulse generator PG1 that will ensure that the ring counter RC2 in FIG. 3 is in its C5 state. The same CLEAR pulse will set the ring counter RC5 in FIG. 4 to its zero state if it is not already in that state.

With the flip-flop TF in its reset state, the gate 23 will be enabled, during the period that the start pushbutton 9 is held closed, to pass clock pulses CP to the ring counter RC1.

As long as the flip-flop TF remains reset, the counter RC1 will continue to advance. The gate 31 will hold the switch S3 open to admit the output signal from the oscillator 25 to the summing amplifier 33 and apply it to the line L over the switch S1.

Referring now to FIG. 8, with the switch S2 closed the 3 kilocycle frequency now supplied over the line will be admitted to the ring counter RC6 through the switch S16. The latter is closed as long as the flip-flop RF is in its reset state. When the counter RC6 receives the 64th pulse of current from the frequency standard 25 in FIG. 2, it will set the flip-flop RF to produce the level RECEIVER ON.

In the meantime, synchronizing of the phase-locking oscillator 105 has been accomplished by the signal at the transmitter clock frequency admitted through the switch S16 to the phase-sensitive detector 103. The receiver is now locked in synchronism with the transmitter, and the clock pulses RC produced by the generator PG4 are in a fixed phase relation to those of the pulse shaper 27 in FIG. 2.

The next significant event will be the release of the start pushbutton 9. When that occurs, with the levels SE and ST both present, the gate 21 in FIG. 2 will be enabled by the inverter 19 to produce the level START SEND. When that occurs, the gate 29 will begin to supply transmitter clock pulses TC.

Referring now to FIG. 3, with the level C5 initially present, the switch S6 is closed and the switch S7 is open. It will be recalled that the counter RC3 is initially in the state P6. The first clock pulse TC applied through the switch S6 will advance the counter RC3 to the state P7. Referring to FIG. 2, that will cause the gates 37 and 35 to close the switch S4 and admit one cycle of the output signal of the frequency standard 25 to the line.

Referring to FIG. 9, the ring counter RC12 is initially in the state producing the level RC5. With the level RECEIVER ON now present, the gate 165 will set the flip-flop FR7 to produce the level R7.

Referring now to FIG. 8, with the level R7 present, the switch S17 will be closed. Thus, the pulses supplied to the line by the switch S4 in FIG. 2 will be supplied to the counter RC8 in FIG. 8 and also to the phase-sensitive detector 103 to resynchronize the phase-locking oscillator 105.

Referring again to FIG. 3, the counter RC3 will continue to count through the states P8, P9 and P10. Each of these states will cause another cycle of the frequency standard output (FIG. 2) to be supplied through the switch S4 to the line. When, referring now to FIG. 8, the counter RC8 has counted the fourth of these pulses, the flip-flop FR5 will be set to produce the level R5.

With the level R5 present, the switch S25 in FIG. 9 will be closed to admit clock pulses to the ring counter RC11. It is assumed that the counter is initially in the state producing the signal RP6, and that the first such clock pulse sets it to the state RP1. That will cause the flip-flop FR7 in FIG. 9 to be reset and open the switch S17 in FIG. 8. At the same time, the pulse STP that set the flip-flop FR5 sets the flip-flop FR6 to close the switch S18.

Referring again to FIG. 3, at the next TC pulse following the setting of the counter RC3 to the state P10, the counter will be set to the state P1. That will enable the gate 49 in FIG. 2.

At the same time that the gate 49 in FIG. 2 is enabled, the switch S10 in FIG. 4 is opened, by the removal of the signal P10, to start a fast sweep by the sweep generator 99. With the level C5 present, the switch S9 is closed to apply the sweep voltage to the intensity control amplifier 97 for the cathode ray tube 93. If there is any information on the document 3 in the first quarter of the first line being scanned at this time, the flip-flop 1F in FIG. 2 will be set by the gate 49. If not, it will remain reset.

At the next clock pulse TC, the counter RC3 will be stepped to the state P2. At a corresponding time, the counter RC11 in FIG. 9 in the receiver will be stepped to count RP2, enabling the gate 143. The gate 41 in FIG. 2 will now be enabled, and if the flip-flop 1F was set, a pulse will be supplied to the line L by the pulse generator PG2 in FIG. 2, causing the flip-flop FR1 in FIG. 9 to be set. If there were no information in the first quarter of the first line of the document to be copied, the flip-flop FR1 would remain reset.

As the fast scan continues, the counter RC3 will be stepped through the states P2, P3 and P4, successively enabling the gates 51, 53 and 55 in FIG. 2 and causing the flip-flops 2F, 3F and 4F to be set or not set according as there is or is not information in the corresponding quarter of the line segment. In synchronism, the counter RC11 in FIG. 9 will be stepped to successively enable the gates 145, 147 and 149 and register the contents of the flip-flops 1F through 4F in FIG. 2 and the flip-flops FR1 through FR4 in FIG. 9, one step beyond the step in which the corresponding flip-flops in FIG. 2 were set.

Next, the counter RC3 in FIG. 3 will be set to the state P6, causing the OR-gate 69 in FIG. 3 to trigger the pulse generator PG3 and step the counter RC2 to the state C1. At a corresponding clock time, the counter RC11 in FIG. 9 will be set to the state RP6 and apply a pulse through the gate 135 to step the counter RC12 to the state RC1.

The video signal produced by the flying spot scanner 1 in FIG. 4 is now applied to the line L by the switch S5 in FIG. 2, closed when the state C5 is not present. The switches S3 and S4 in FIG. 2 will now be opened.

At the COUNT pulse that advanced the counter RC12 in FIG. 9 to count RC1, the flip-flop FR5 in FIG. 8 is reset, opening the switch S25 in FIG. 9.

Referring to FIG. 3, when the counter RC2 is advanced to count C1, the switch S7 in FIG. 3 is closed and transmitter clock pulses TC are admitted to the counter RC4. If the flip-flop F1 had been set, the AND-gate 77 will produce a logic 1 signal that is applied through the OR-gate 75 to close the switch S8 and bypass the counter RC4. If the flip-flop F1 had not been set, the counter RC4 would proceed to a full count of 256.

When the counter RC2 in FIG. 3 is set to C1, the gate 61 will produce a pulse TST to start a slow sweep by closing the switch S12 in FIG. 4 to initiate a sweep by the sweep generator 101. The switch S11 is closed at this time because the level C5 is not present.

Referring now to FIG. 9, at a time corresponding to the time that the transmitter counter RC2 is set to C1, the receiver counter RC12 goes to the state RC1, and the switch S24 is closed to admit clock pulses to the counter RC10. If the flip-flop FR1 in FIG. 9 had been set, the counter RC10 would proceed to a full 256 count. However, if it was not set, a SKIP signal would be produced by the gate 151, and the switch S26 would be closed.

When the counter RC12 in FIG. 9 goes to the state RC1, the gate 163 will trigger the pulse generator PG6 to produce a pulse RST that will initiate a slow sweep by closing the switch S20 in FIG. 8 to reset the slow-sweep generator 125.

If there is information in the first quarter of the line being scanned on the transmitter, both the transmitter counter RC2 in FIG. 3 and the receiver counter RC12 in FIG. 9 will remain in the states C1 and RC1, respectively, while a 256 count scan is completed. If there was no information in that quandrant, the next clock pulse would advance the counter RC2 to the state C2 and the counter RC12 in FIG. 9 to the state RC2. The first line scan will accordingly be completed in a minimum of four clock pulses, and a maximum of 1024 clock pulses, in dependence upon the amount of information in the line.

The sequential quarters of the line will be scanned as the counter RC2 is successively stepped to the states C2, C3 and C4 and the counter RC12 is synchronously stepped to the states RC2, RC3 and RC4. When the last quandrant of the first line has been scanned, the counter RC2 will be advanced to the state C5, and the counter RC12 in FIG. 9 will be advanced to the state RC5.

When the counter RC2 goes to the state C5, the pulse C5P will be produced to step the counter RC5 in FIG. 4 to the next line scan, changing the Y voltage to reposition the beam for that line. At a corresponding time, the counter RC7 in FIG. 8 will be reset by the pulse RC5P produced when the counter RC12 goes to the state RC5. The same pulse RC5P will cause the pulse generator PG5 to step the counter RC9 in FIG. 8 and adjust the Y voltage applied to the flying spot generator tube 121 to the correct value for the second line to be scanned.

The counter RC3 in FIG. 3 will now be successively advanced to the states P7, P8, P9 and P10, resynchronizing the oscillator 105 in FIG. 8 in the same manner described above. The mode of operation during the following portion of the second line scan will be the same as for the first line described in detail above, except that the scanning rate will be determined by the information content of the second line, and the Y voltage applied to the cathode ray tubes in the transmitter and receiver will be that appropriate for the second line.

Operation will proceed as just described until the counter RC5 in FIG. 4 is set to count 1024, whereupon the last line will be scanned. At the end of that line, counter RC5 will be reset to count 0 by the pulse C5P produced when the counter RC2 is set to count C5. That event cause the transmitter SYSTEM RESET signal to be produced by the counter RC5 in FIG. 4, resetting the flip-flops STF, TF and SEF in FIG. 2.

During a time corresponding to that in which the last line is transmitted, it will be recorded on the record member 15 in the flying spot generator 13 in FIG. 8. At the end of that line, the counter RC12 in FIG. 9 will be set to count RC5, causing the pulse RC5P to be produced and resetting the Y counter RC9 in FIG. 8. When that occurs, the flip-flop DPF will be set and the TRANSMISSION COMPLETE sequence of eight pulses will be produced in the manner described above, with the switch S33 closed to admit pulses RC to the pulse generator and the counter RC7 until the latter runs out and resets the flip-flop DPF.

The TRANSMISSION COMPLETE pulses will be received by the gate 169 in FIG. 2, with the levels TF and SYSTEM RESET present, and the counter RC13 will be stepped. When the eighth pulse is received, the counter RC13 will produce the reception complete signal RC, setting the flip-flop SEF and resetting the flip-flop TF. Nothing further will happen in either transmitter or receiver until the start push button 9 in FIG. 2 is depressed to initiate a new transmission.

In the event of an interruption in the transmission of the page, at the end of the page transmission the flip-flop SEF would remain reset (FIG. 2), causing the lamp L1 to be illuminated and thereby indicating that there had been an error in transmission. The operator could then restore the system to operation by momentarily depressing the error reset switch S27. After taking such corrective action as might be indicated, the operator could then depress the start button 9 to repeat the transmission.

At the receiver, interruption on the line would cause a failure to produce RC5 pulses at frequent intervals, allowing the timing circuit 112 in FIG. 8 to run out and set the error flip-flop EF. That would energize the RCVR OFF LINE light L2, signalling to the operator that an error in transmission had occurred. That would occur after the line had been opened for a maximum of, for example, three line transmission times. After reestablishing the transmission line connection, the operator could restart the system by pressing the receiver SYSTEM RESET button 131.

While I have described my invention with respect to the details of the preferred embodiment thereof, many changes and variations will occur to those skilled in the art upon reading my description, and such can obviously be made without departing from the scope of my invention.

Having thus described my invention, what I claim is:

1. Apparatus for producing an information signal corresponding to reproducible data occurring in a set of *m* linearly sequential regions on a record member, where *m* is a positive integer greater than one, comprising:

reproducing means adapted to be operatively connected to the record member for reproducing the data in each region to form a signal, first control means operatively connected to said reproducing means for rapidly reproducing the data in each region to form a first signal,

*m* storage means controlled by said first control means and said reproducing means for registering the presence or absence of recorded data in the portions of said first signal corresponding to each region, and second control means operatively connected to said reproducing means and controlled by said storage means for slowly reproducing the data in each region containing recorded data to form an information signal.

2. The apparatus of claim 1, further comprising:

an oscillator, counting means controlled by said oscillator for counting through a predetermined sequence to sequentially actuate said first control means and then said second control means when said storage means registers the presence of data, a transmitter output terminal, means controlled by said register and said counting means for applying signals corresponding to the contents of said registers to said output terminal, means for applying synchronizing signals from said oscillator to said output terminal, and means controlled by said counting means and said second control means for applying said information signal to said output terminal.

3. The apparatus of claim 2, further comprising:

a receiver input terminal, a transmission line, switching means for connecting said output terminal to said input terminal over said transmission line, a second oscillator, means responsive to said synchronizing signals for synchronizing said second oscillator, second counting means controlled by said second oscillator to count through a sequence corresponding to the counting sequence of the counting means of claim 2, a second set of *m* registers, means responsive to signals on said transmission line and controlled by said second counting means for storing said signals corresponding to the register contents of claim 2 in said second registers, and recording means responsive to signals on said transmission line and controlled by said second counting means and said second registers for recording said information signals on a second member in regions corresponding to those regions from which they were derived.

4. The apparatus of claim 3, further comprising:

timing means controlled by said second oscillator and responsive to signals on said transmission line for producing an output signal when the interval between signals on said transmission line exceeds a predetermined time.

5. A reproduction system, comprising:

a transmitter, a receiver, a transmission line, and switching means operable to connect said transmitter to said receiver over said transmission line, said transmitter comprising signal generating means responsive to data stored on a record member for producing a first information signal corresponding to the data stored on the record member, a sequence of first storage means synchronized with said signal generating means and responsive to said first information signal for registering the presence or absence of data in a linear sequence of regions on the record member, means controlled by said storage means for producing a second sequence of information signals corresponding to the contents of said first storage means, means controlled by said signal generating means and said first storage means for producing a third information signal corresponding to the data contents of those regions on the record member in which data is recorded, and means responsive to said second and third information signals and operable when said transmitter is connected to said receiver to sequentially apply said second and third information signals to said transmission line, said receiver comprising a second sequence of storage means one for each first storage means, means operable when said transmitter is connected to said receiver for storing said second information signals in said second storage means, and recording means controlled by said second storage means and operable when said transmitter is connected to said receiver to record said third information signal on a record member in linearly sequential regions determined by the contents of said second storage means.

6. The apparatus of claim 5, further comprising:

means controlled by said receiver recording means for applying a transmission complete signal to said transmission line after a predetermined sequence of regions on second member have been recorded, said transmitter further comprising means responsive to said transmission complete signal to indicate that a complete transmission has been received.

7. A facsimile transmitter, comprising:

signal generating means responsive to data stored on a line on a record member for producing a first information signal corresponding to the data stored on the record member, a first plurality of storage means synchronized with said signal generating means and responsive to said first information signal for registering the presence or absence of data in a corresponding plurality of sequential regions on said line on the record member, means controlled by said storage means for producing a second information signal corresponding to the contents of said storage means, means controlled by said signal generating means and said storage means for producing a third information signal corresponding to the data contents of those regions on the record member on which data is recorded, and sequencing means responsive to said second and third information signals for applying said second and third signals sequentially to a transmission line.

8. The apparatus of claim 7, in which said sequencing means comprises:

an oscillator and counting means controlled by said oscillator, an output terminal adapted to be connected to a transmission line, and means controlled by said counting means for applying said second and third signals to said output terminal, and further comprising means operable to apply a sequence of synchronizing signals from said oscillator to said output terminal.

9. A facsimile receiver, comprising:

an input terminal adapted to be connected to a signal source, a register, data recording means responsive to an applied data signal and an applied address signal for recording the data signal in a region on a second record member determined by the address signal, a cyclic address counter, means controlled by said address counter for supplying an address signal to said recording means in accordance with the state of the counter, first switching means closable to connect said terminal to said register, second switching means closable to connect said terminal to said recording means, sequencing means connected to said terminal and responsive to pulses applied thereto to sequentially assume first and second states, means controlled by said sequencing means in its first state for closing said first switching means to store in said register a first or a second signal according as pulses are or are not applied to said terminal while said first switching means is closed, respectively, means responsive to the setting of said sequencing means to its first state for advancing said address counter, and means controlled by said sequencing means in its second state and by said register for closing said second switch for a period determined by the signal stored in said register.

10. The apparatus of claim 9, in which said sequencing means comprises:

an oscillator, means responsive to synchronizing signals applied to said input terminal for synchronizing said oscillator, and counting means controlled by said oscillator to count through a predetermined sequence.

11. The apparatus of claim 9, further comprising:

means responsive to the setting of said address counter to a predetermined state for applying a transmission complete signal to said input terminal.

12. A facsimile receiver, comprising:

a terminal adapted to be connected to a signal source, a recording transducer responsive to three applied signals for recording data determined by a first of said signals on a record member in a region determined by a second of said signals and at a rate determined by the third of said signals, first switching means closable to connect said terminal to said transducer to apply a first signal to said transducer in accordance with the signal present on said terminal, a first counter, means controlled by said first counter for applying a second signal to said transducer in accordance with the state of said first counter, a second counter settable to first and second states, a register, second switching means closed by said second counter in its first state for connecting said terminal to said register to store the presence or absence of a signal on said terminal, means responsive to the setting of said second counter to its first state for applying a count signal to step said first counter, a third counter, means controlled by said second counter in its first state for applying count signals to step said third counter, means controlled by said third counter in a first state for setting said second counter to its second state, means controlled by said second counter in its second state for closing said first switching means, and means controlled by said second counter in its second state and said register for applying a third signal to said transducer if the presence of data on said terminal is stored in said register.

13. A facsimile transmitter comprising:

an output terminal adapted to be connected to a transmission line, an oscillator, an adjustable scanning transducer having a scanning rate determined by the extend of its adjustment and responsive to data stored on a record member to produce an electrical output signal corresponding to the stored data at a data rate in accordance with its adjustment, a first counter settable to first and second states, a plurality of registers settable to first and second states, switching means controlled by said first counter in its first state for sequentially connecting said transducer to said registers to set each to its first or its second state according as data is or is not produced by said transducer, respectively, during the period of each such connection, means controlled by said first counter in its first state for adjusting said transducer to a first scanning rate, switching means controlled by said first counter in its first state and said registers for applying a signal corresponding to the states of said registers to said transmission line, a second counter settable to first and second states, means controlled by said first counter in its first state and said oscillator for stepping said second counter, means controlled by said second counter in a predetermined state for setting said first counter to its second state, means controlled by said first counter in its second state and each of said registers in its first state for adjusting said transducer to a second scanning rate lower than said first rate, and means controlled by said first counter in its second state and said transducer for applying said output signal to said transmission line.

14. In combination, a flying spot scanner adapted to scan a record member a line at a time and produce a data signal in accordance with data recorded on said record member in response to two applied deflection signals which in combination determine the coordinates of the spot on the record member, clock pulse-generating means for producing a train of clock pulses, a first ring counter settable to at least two states, means responsive to an applied start signal for setting said first ring counter to a first state, a second ring counter, means controlled by said second counter for applying a first deflection signal to said scanner in accordance with the state of the second counter, means responsive to the setting of said first ring counter to its first state for applying a counting signal to said second counter, means controlled by said first ring counter in its first state for applying a second deflection signal to said scanner which second signal changes at a first rate, a register, means controlled by said first ring counter in its first state and said scanner for storing a data present or a data absent signal in said register according as said data signal does or does not contain information while said second deflection signal changes at said first rate, respectively, a third ring counter, means controlled by said clock pulses generating means and said first ring counter in its first state for applying clock pulses to said third ring counter, an output terminal adapted to be connected to a transmission line, means controlled by said third ring counter in a first state, said first ring counter in its first state, and said register for applying a signal determined by the contents of said register to said output terminal, means controlled by said third ring counter in a second state for setting said first ring counter to its second state, timing means controlled by said first counter in its second state and said register for applying a second deflection signal to said scanner which second second signal change at said first rate or at a second rate slower than said first rate according as said data absent signal or said data present signal is stored in said register, for a time dependent on said rate of change sufficient to reach a predetermined amplitude, respectively, means controlled by said first ring counter in its second state and said scanner for applying said data signal to said output terminal, and means controlled by said first ring counter in its second state and said timing means for setting said first ring counter to its first state when said second deflection signal reaches said predetermined amplitude.

15. The apparatus of claim 14, in which said clock pulse-generating means comprises:

an oscillator, and further comprising means controlled by said first ring counter in its first state and said third ring counter in states other than said first state for connecting said oscillator to said output terminal.

16. A facsimile transmission system, comprising:

a transmitter, a receiver, a transmission line, and switching means operable to connect said transmitter to said receiver over said transmission line, said transmitter comprising adjustable rate transducing means for producing an output signal in accordance with data recorded on a record member at a rate dependent on the state of its adjustment, means for adjusting said transducing means to produce a first output signal at a first rate, a plurality of first registers, sequencing means, means controlled by said sequencing means and said transducing means for sequentially storing a first or a second signal in each of said first registers according as said first output signal contains or does not contain data, respectively, in a corresponding sequence of portions of said first output signal, adjusting means sequentially controlled by each of said first registers for sequentially adjusting said transducing means to produce a second output signal with the same data content as said first output signal at a second slower rate when said first signal is stored in that one of each of said registers then controlling said adjusting means, and sequencing means for applying the contents of said registers and said second output signal to said receiver over said transmission line, and said receiver comprising a second plurality of registers, one for each of said first registers, means for setting said second registers to correspond with the transmitted contents of said first registers, and recording means controlled by said transmission line and said second registers for recording said second output signal on a record member.

17. The apparatus of claim 16, in which said transducing means comprises:

means responsive to two applied deflection signals for locating a storage cell in a record member, and further comprising a first counter, a second counter, said first recited transducer adjusting means comprising first deflection signal-generating means controlled by said first counter in a first state for applying a first deflection signal changing at a first rate to said transducing means, in which said means controlled by said first registers for adjusting said transducing means comprises second signal-generating means enabled by said first counter in a second state, and further comprising means controlled by said second counter for applying a second deflection signal to said transducing means having an amplitude determined by the state of said second counter, and means responsive to the setting of said first counter to said first state for stepping said second counter, in which said sequencing means comprises means controlled by said first counter in its first state for applying the contents of said registers to said transmission line and means controlled by said first counter in its second state for applying said second output signal to said transmission line.

18. A facsimile system, comprising:
a transmitter,
a transmission line,
a receiver, and
switching means for connecting said transmitter to said receiver over said transmission line, said transmitter comprising means for rapidly scanning a region on a first record member and producing an output signal having a first or second characteristic according as said region contains or does not contain recorded data, respectively, a register responsive to said scanning means for storing said output signal, means controlled by said register for slowly scanning the region of the second member that was rapidly scanned when said register stores a signal having said first characteristic to produce a data signal corresponding to the recorded data in that region, a first oscillator, first counting means controlled by said oscillator for sequentially actuating said scanning means to complete the scan of the record member a region at a time with the concomitant storage of signals in said register and the production of data signals from those regions containing recorded data, means for connecting said oscillator to said transmission line to supply synchronizing signals to said receiver, and means controlled by said counting means for sequentially applying the signals stored in said register and said data signals to said transmission line, said receiver comprising a recording transducer for recording applied signals on a second record member in regions determined by applied address signals, a second oscillator, means responsive to said synchronizing signals on said transmission line for synchronizing said second oscillator with said first oscillator, second counting means controlled by said second oscillator for applying address signals to said recording transducer in synchronism with said transmitter scanning means, and means controlled by said second counting means and said transmission line for recording said data signals on said second record member in regions corresponding to the regions on said first record member from which they were derived.

19. The method of reproducing data recorded in a plurality of first regions on a first record member interspersed with second regions on which no data is recorded, each of said first regions comprising a plurality of linearly sequential segments in which data may or may not be recorded, and each of said second regions comprising a corresponding plurality of linearly sequential segments in which no data is recorded, comprising:
the steps of scanning each region along said linear segments to determine the presence or absence of data therein, storing a signal for each segment indicating the presence or absence of data in that segment, applying signals corresponding to the registered sequence of stored signals to a transmission line,
detecting the signals on the transmission line at a remote location,
storing the detected signals as an indication of the transmitting sequence that will follow,
scanning each region of the first record member that contains data and applying a data signal to said transmission line in accordance with said data, detecting said data signals at said remote location, and reproducing said data signals on a second member in regions directed by said stored detected signals.

20. A facsimile system, comprising:
a transmitter,
a receiver,
a transmission line, and
switching means for connecting said transmitter to said receiver over said transmission line, said transmitter comprising a document scanner responsive to a line position signal and a line sweep signal to produce a first output signal varying in accordance with the data recorded on a document to be duplicated in a line of data selected by the line position signal, a transmitter oscillator, a transmitter register, first cyclic transmitter counting means controlled by said oscillator, a line position counter controlled by said first counting means to advance to a different state once for each cycle of said first counting means to a first state,
means controlled by said line position counter for applying a line position signal to said document scanner in accordance with the state of the line position counter,
means actuated by said first counting means in said first state for applying a rapidly changing sweep signal to said document scanner and connecting said scanner to said register to set the register if data is detected during the scan,
means actuated by said first counting means in a second state for applying a slowly changing sweep signal to said document scanner when said register is set to produce a second output signal varying in accordance with the data recorded on the line selected by the line position signal,
means controlled by said first counting means its second state for applying a second output signal to said transmission line,
means controlled by said first counting means in its first state for applying a synchronizing signal sequence from said oscillator to said transmission line, and
means controlled by said register and said first counting means in its first state for applying a register signal in accordance with the state of said register to said transmission line, said receiver comprising a receiver oscillator,
means responsive to said synchronizing signal sequence for synchronizing said receiver oscillator, first cyclic receiver counting means controlled by said second oscillator in synchronism with said first transmitter counting means,
a receiver register,
means controlled by said transmission line and said first counting means for setting said receiver register in accordance with said register signal,
a receiver line position counter,
a recording transducer responsive to a line position signal and a line sweep signal to record a data signal on a record member in a line selected by the line position signal,
means controlled by said receiver line position counter for applying a line position signal to said recording transducer in accordance with the state of said receiver line position counter,
means controlled by said first receiver counting means to advance said receiver line position counter once for each cycle of said first receiver counting means to a first state, and
means actuated by said first receiver counting means in a second state and responsive to a second output signal on said transmission line for applying that signal as a data signal to said recording transducer.

21. A reproduction system, comprising:
a transmitter,
a receiver, and
switching means operable to connect said transmitter to said receiver,
said transmitter comprising signal generating means for scanning a record member along a sequence of lines parallel to a predetermined axis and responsive to data stored on a record member for producing for each line a first information signal corresponding to the data stored on that line on the record
a first plurality of storage means synchronized with said signal generating means and responsive to said first information signal for registering the presence or absence of data in a sequence of linearly sequential regions on one line on the record member,
means controlled by said storage means for producing a second information signal corresponding to the contents of said storage means,
means controlled by said signal generating means and said storage means for producing a third information signal corresponding to the data contents of those regions on the record member in which data is recorded,
and means responsive to said second and third information signals and operable when said transmitter is connected to said receiver to sequentially apply said second and third information signals to said receiver,
said receiver comprising a second plurality of storage means, one for each of said first storage means, means operable when said transmitter is connected to said receiver for storing said second information signal in said second storage means, and recording means controlled by said second storage means and operable when said transmitter is connected to said receiver to record said third information signal on a record member in regions determined by the contents of said second storage means.

22. The apparatus of claim 21, further comprising:
means controlled by said receiver recording means for producing a transmission complete signal after a predetermined sequence of regions on second member have been recorded, said transmitter further comprising
means responsive to said transmission complete signal to indicate that a complete transmission has been received.

23. A transmitter comprising:
an output terminal, an oscillator, an adjustable scanning transducer having a scanning rate determined by the extent of its adjustment and responsive to data stored on a record member to produce an electrical output signal corresponding to the stored data a line at a time at a data rate in accordance with its adjustment, a first counter settable to first and second states, a plurality of registers settable to first and second states, switching means controlled by said first counter in its first state for sequentially connecting said transducer to said registers to set each to its first or its second state according as data is or is not produced by said transducer during said connection, respectively, means controlled by said first counter in its first state for adjusting said transducer to a first scanning rate, switching means controlled by said first counter in its first state and said registers for applying signals corresponding to the states of said register to said output terminal, a second counter settable to first and second states, means controlled by said first counter in its first state and said oscillator for stepping said second counter, means controlled by said second counter in a predetermined state for setting said first counter to its second state, means controlled by said first counter in its second state and sequentially controlled by said registers each when in its first state for adjusting said transducer to a second scanning rate slower than said first rate, and means controlled by said first counter in its second state and said transducer for applying said output signal to said output terminal.

24. In combination, a scanning means adapted to scan a record member a line at a time and produce a data signal in accordance with data recorded on said record member in response to two applied deflection signals which in combination determine the coordinates of the spot on the record member,
clock pulse generating means for producing a train of clock pulses,
a first counter settable to at least two states,
means responsive to an applied start signal for setting said first counter to a first state,
a second counter,
means controlled by said second counter for applying a first deflection signal to said scanning means in accordance with the state of the second counter,
means responsive to the setting of said first counter to its first state for applying a counting signal to said second counter,
means controlled by said first counter in its first state for applying a second deflection signal to said scanning means which second signal changes at a first rate,
a register,
means controlled by said first counter in its first state and said scanner for storing a data present or a data absent signal in said register according as said data signal does or does not contain information while said second deflection signal changes at said first rate, respectively, a third counter, means controlled by said clock pulses generating means and said first counter in its first state for applying clock pulses to said third counter, an output terminal, means controlled by said third counter in a first state, said first counter in its first state, and said register for applying a signal determined by the contents of said register to said output terminal, means controlled by said third counter in a second state for setting said first counter to its second state, timing means controlled by said first counter in its second state and said register for applying a second deflection signal to said scanning means which second signal changes at said first rate or at a second rate slower than said first rate according as said data absent signal or said data present signal is stored in said register, respectively, means controlled by said first counter in its second state and said scanning means for applying said data signal to said output terminal, and means controlled by said first counter in its second state and said timing means for setting said first counter to its first state when said second deflection signal reaches a predetermined amplitude.

25. The apparatus of claim 24, in which said clock pulse generating means comprises:
an oscillator,
and further comprising means controlled by said first counter in its first state and said third counter in states other than said first state for connecting said oscillator to said output terminal.

26. A facsimile system, comprising:
a transmitter,
a receiver, and
switching means operable to connect said transmitter to said receiver, said transmitter comprising adjustable rate transducing means for producing an output signal in accordance with data recorded on a record member at a rate dependent on the state of its adjustment, means for adjusting said transducing means to produce a first output signal at a first rate, a first plurality of registers, means controlled by said sequencing means and said transducing means for sequentially storing a first or a second signal in each of said first registers according as said first output signal contains or does not contain data in the region being scanned while that registers is being stored, respectively, means sequentially controlled by said first registers for adjusting said transducing means to produce a second output signal with the same data content as said first output signal at a second slower rate when said first signal is stored in said register then in control, sequencing means for applying the contents of said registers and said second output signal to said receiver, and said receiver comprising a second plurality of registers, one for each of said first registers, means for setting said second registers to correspond with the contents of said first registers, and recording means controlled by said second registers for recording said second output signal on a record member.

27. The apparatus of claim 26, in which said transducing means comprises:
means responsive to two applied deflection signals for locating a storage cell in a record member, and further comprising a first counter, a second counter, said first recited transducer adjusting means comprising first deflection signal generating means controlled by said first counter in a first state for applying a first deflection signal changing at a first rate to said transducing means, in which said means controlled by said first register for adjusting said transducing means comprises second signal generating means enabled by said first counter in a second state, and further comprising means controlled by said second counter for applying a second deflection signal to said transducing means having an amplitude determined by the state of said second counter, and means responsive to the setting of said first counter to said first state for stepping said second counter, in which said sequencing means comprises means controlled by said first counter in its first state for sequentially applying the contents of said registers to said output terminal and means controlled by said first counter in its second state for applying said second output signal to said output terminal.

28. In combination,
a transmitter,
a receiver, and
switching means for connecting said transmitter to said receiver, said transmitter comprising means for rapidly scanning a set of linearly sequential regions on a first record member and producing an output signal having a first or second characteristic according as each said region contains or does not contain recorded data, respectively, a set of registers sequentially responsive to said scanning means for storing said output signals, means sequentially controlled by said registers for slowly scanning the region of the first record member that was rapidly scanned when said register in control stores a signal having said first characteristic to produce a data signal corresponding to the recorded data in that region, a first oscillator, first counting means controlled by said oscillator for sequentially actuating said scanning means to complete the scan of the first record member a region at a time with the concomitant storage of signals in said registers and the production of data signals from those regions containing recorded data, means for connecting said oscillator to said receiver to supply synchronizing signals to said receiver, and means controlled by said counting means for sequentially applying the signals stored in said registers and said data signals to said receiver, said receiver comprising a recording transducer for recording applied signals on a second record member in regions determined by applied address signals, a second oscillator, means responsive to said synchronizing signals for synchronizing said second oscillator with said first oscillator, second counting means controlled by said second oscillator for applying address signals to said recording transducer in synchronism with said transmitter scanning means, and means controlled by said second counting means and responsive to the signals applied to said receiver for recording said data signals on said second record member in regions corresponding to the regions on said first record member from which they were received.

29. A facsimile system, comprising:
a transmitter,
a receiver, and
switching means for connecting said transmitter to said receiver, said transmitter comprising a document scanner responsive to a line position signal and a line sweep signal to produce a first output signal varying in accordance with the data recorded on a document to be duplicated in a line of data selected by the line position signal, a transmitter oscillator, a transmitter register, first cyclic transmitter counting means controlled by said oscillator, a line position counter controlled by said first counting means to advance to a different state once for each cycle of said first counting means to a first state,
means controlled by said line position counter for applying a line position signal to said document scanner in accordance with the state of the line position counter,
means actuated by said first counting means in said first state for applying a rapidly changing sweep signal to said document scanner and connecting said scanner to said register to set the register if data is detected during the scan,
means actuated by said first counting means in a second state for applying a slowly changing sweep signal to said document scanner when said register is set to produce a second output signal varying in accordance with the data recorded on the line selected by the line position signal,
means controlled by said first counting means in its second state and said switching means for applying second output signal to said receiver,
means controlled by said first counting means in its first state and said switching means for applying a synchronizing signal sequence from said oscillator to said receiver, and
means controlled by said register, said switching means, and said first counting means in its first state for applying a register signal in accordance with the state of said register to said receiver, said receiver comprising a receiver oscillator,
means responsive to said synchronizing signal sequence for synchronizing said receiver oscillator, first cyclic receiver counting means controlled by said second oscillator in synchronism with said first transmitter counting means,
a receiver register,
means controlled by said switching and said first counting means for setting said receiver register in accordance with said register signal,
a receiver line position counter,
a recording transducer responsive to a line position signal and a line sweep signal to record a data signal on a record member in a line selected by the line position signal,
means controlled by said receiver line position counter for applying a line position signal to said recording transducer in accordance with the state of said receiver line position counter,
means controlled by said first receiver counting means to advance said receiver line position counter once for each cycle of said first receiver counting means to a first state, and
means actuated by said first receiver counting means in a second state and responsive to a second output signal from said transmitter for applying that signal as a data signal to said recording transducer.

* * * * *